J. HAGUE.
STEAM TRAP.
No. 62,841. Patented Mar. 12, 1867.
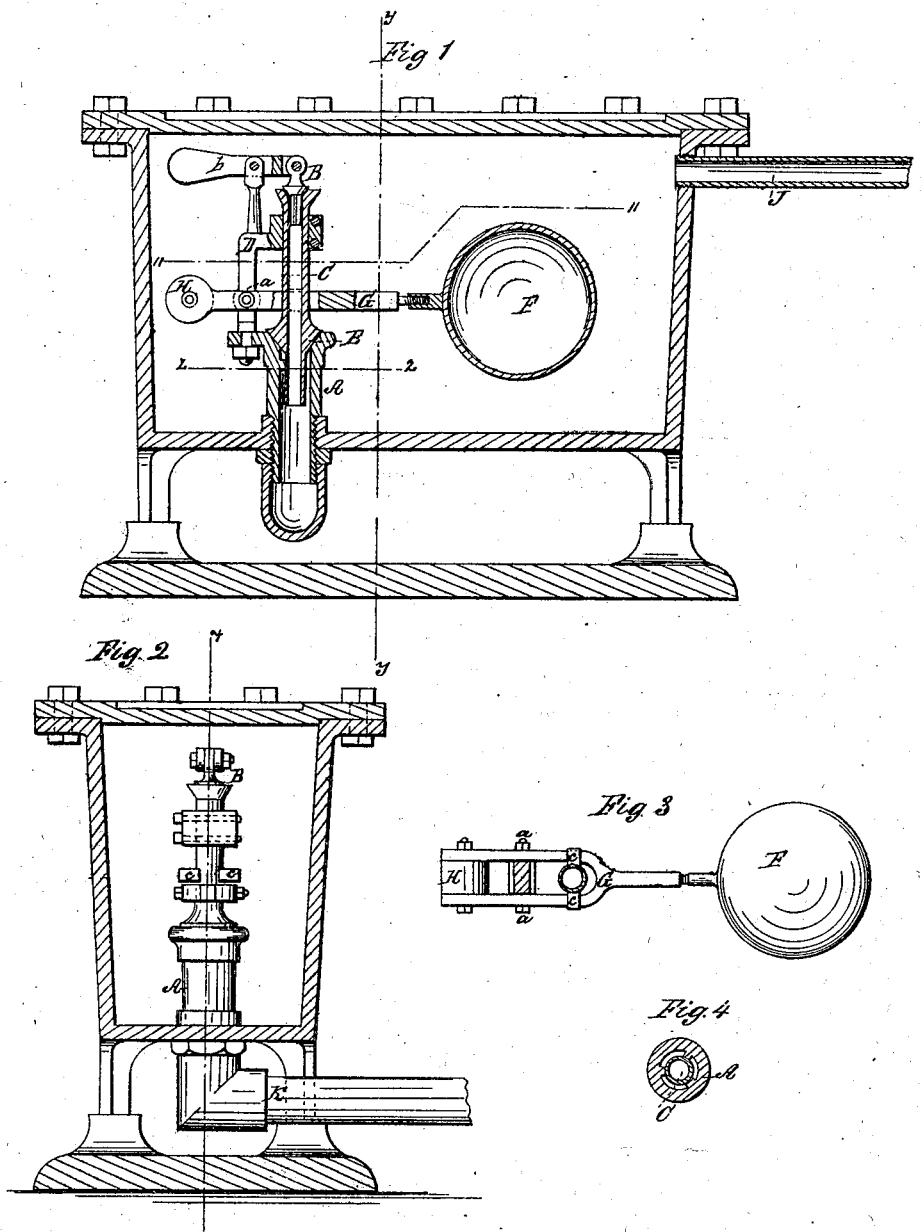

United States Patent Office.

JOHN HAGUE, OF PROVIDENCE, RHODE ISLAND.

Letters Patent No. 62,841, dated March 12, 1867.

IMPROVEMENT IN STEAM TRAPS.

*The Schedule referred to in these Letters Patent and making part of the same.*

TO ALL WHOM IT MAY CONCERN:

Be it known that I, JOHN HAGUE, of Providence, in the county of Providence, and State of Rhode Island, have invented a new and improved Steam and Air Trap; and I do hereby declare that the following is a full, clear, and exact description thereof, which will enable others skilled in the art to make and use the same, reference being had to the accompanying drawings, forming part of this specification.

This invention relates to an improved method of relieving steam pipes and other pipes of confined air and the water of condensation; and the invention chiefly consists in a hollow valve-stem, which is applied in the manner hereinafter described.

Figure 1 is a vertical central section of the trap through the line $x\ x$ of fig. 2.

Figure 2 shows a cross-section of the trap through the line $y\ y$ of fig. 1.

Figure 3 represents a top view of the float from the line of fig. 1; and

Figure 4 shows a cross-section of the valve-tube and end of the valve-stem through the line $z\ z$ of fig. 1.

Similar letters of reference indicate like parts.

A is the valve-tube, which is secured through the bottom of the trap by screws or nuts. This tube supports all the operating parts of the trap. C is the hollow valve-stem. The top of it forms a seat for the air-valve, while the lower portion forms the water-valve, which shuts into a seat on the top of the tube A. B is the air-valve. This valve is balanced, or nearly so, by a lever, $b$, which rests on a stand. D is the stand. It is supported from an ear on the top of the valve-tube A by a screw and nut, or it may be cast with the valve-tube. E is the water-valve, F is the float, and G is the rod or lever attached to the float. The water-valve E and the air-valve B are operated by a float. Fig. 3 shows the construction of the float-lever G. This lever is a fork, which encloses the stem C and the stand D, on which stand is its fulcrum at $a$. H, at the end of the lever, is a counterbalance. On two sides of the valve-stem C there is a lug, $c$, seen in the section of the stem, which passes through the lever G in fig. 3. These lugs rest on the lever, as seen in the drawing, so that when the float is raised by the water which enters the trap the valve-stem is raised and water passes through and out of the trap. But air enters the trap as well as steam and water, and when the valve E is closed, as seen in the drawing, air and steam can pass through the valve B into the hollow stem C and out of the trap. When the rise of the float closes the air-valve it opens the water-valve, and so on, alternately, steam and air enter the trap by the pipe J and are discharged through the pipe K, which is attached to the bottom of the trap or the valve-tube A. In fig. 4 small projections are seen on the inside of the valve-tube A, which serve as guides for the hollow valve-stem C.

Having thus described my invention, what I claim as new, and desire to secure by Letters Patent, is—

The hollow valve-stem C, constructed and arranged substantially as described, in combination with the air and water-valves B and E, and operated substantially as herein set forth.

JOHN HAGUE.

Witnesses:
WILLIAM CLARK.
LEAVITT HOBART, Jr.